US011280366B1

(12) United States Patent
Nielsen et al.

(10) Patent No.: US 11,280,366 B1
(45) Date of Patent: Mar. 22, 2022

(54) GATED SAFETY HOOK

(71) Applicant: Klein Tools, Inc., Lincolnshire, IL (US)

(72) Inventors: Caleb Nielsen, Mundelein, IL (US);
John H. Kargenian, Prospect Heights, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 15 days.

(21) Appl. No.: 17/008,140

(22) Filed: Aug. 31, 2020

(51) Int. Cl.
*F16B 45/02* (2006.01)
*A44C 5/20* (2006.01)

(52) U.S. Cl.
CPC ............ *F16B 45/02* (2013.01); *A44C 5/2019* (2013.01)

(58) Field of Classification Search
CPC ................................ F16B 45/02; A44C 5/2019
See application file for complete search history.

(56) References Cited

U.S. PATENT DOCUMENTS

| | | | | |
|---|---|---|---|---|
| 5,735,025 A | * | 4/1998 | Bailey | F16B 45/02 24/600.1 |
| 6,161,264 A | * | 12/2000 | Choate | F16B 45/02 24/599.5 |
| 6,421,888 B1 | * | 7/2002 | Grenga | F16B 45/02 24/598.9 |
| 2003/0097737 A1 | * | 5/2003 | Gartsbeyn | F16B 45/02 24/599.7 |
| 2008/0120818 A1 | * | 5/2008 | Belcourt | F16B 45/02 24/599.5 |
| 2013/0036579 A1 | * | 2/2013 | Christianson | F16B 45/02 24/600.1 |
| 2018/0345056 A1 | * | 12/2018 | Kekahuna | A63B 27/00 |

\* cited by examiner

*Primary Examiner* — David M Upchurch

(57) ABSTRACT

A gated safety hook includes a structural, load bearing frame, a gate, and a user actuated catch. The gate closes automatically in response to an object being mounted on the hook, the catch automatically moves to lock the gate closed in response to an object being mounted on the hook, and the gate cannot be opened with an object mounted on the hook without engaging against the object.

32 Claims, 14 Drawing Sheets

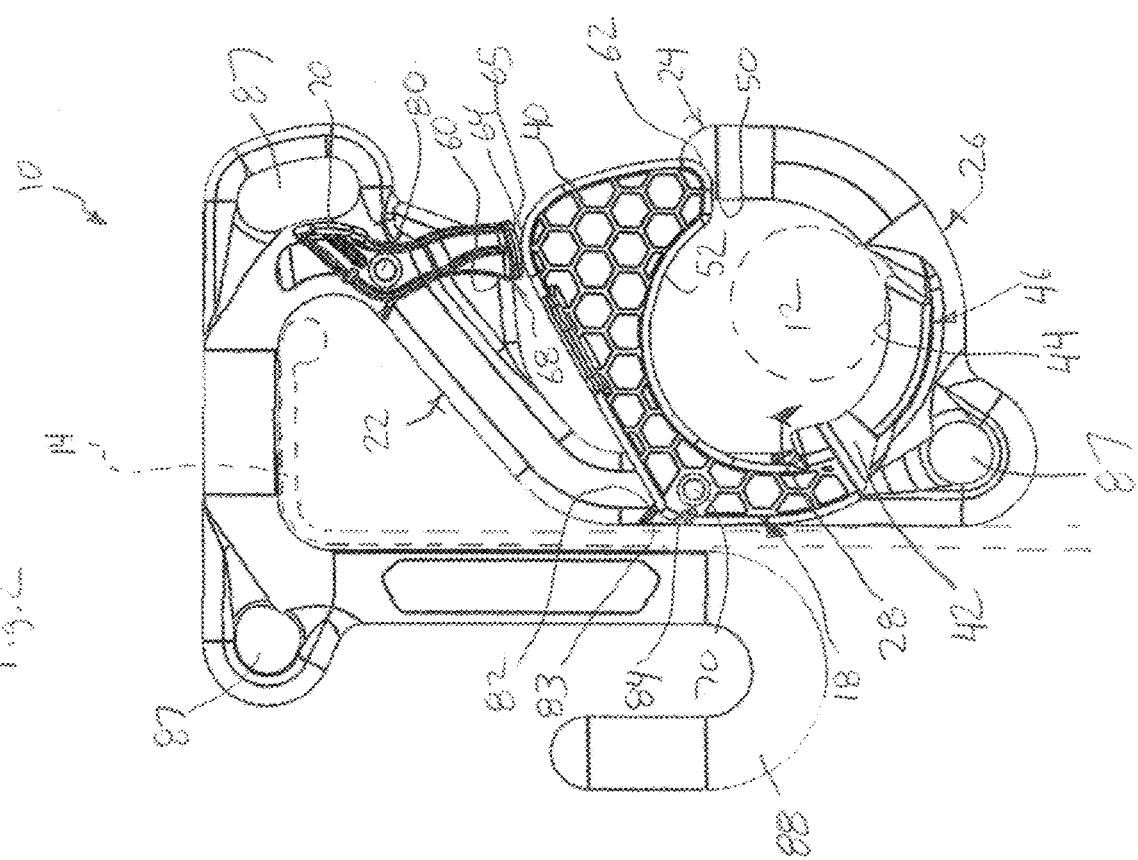
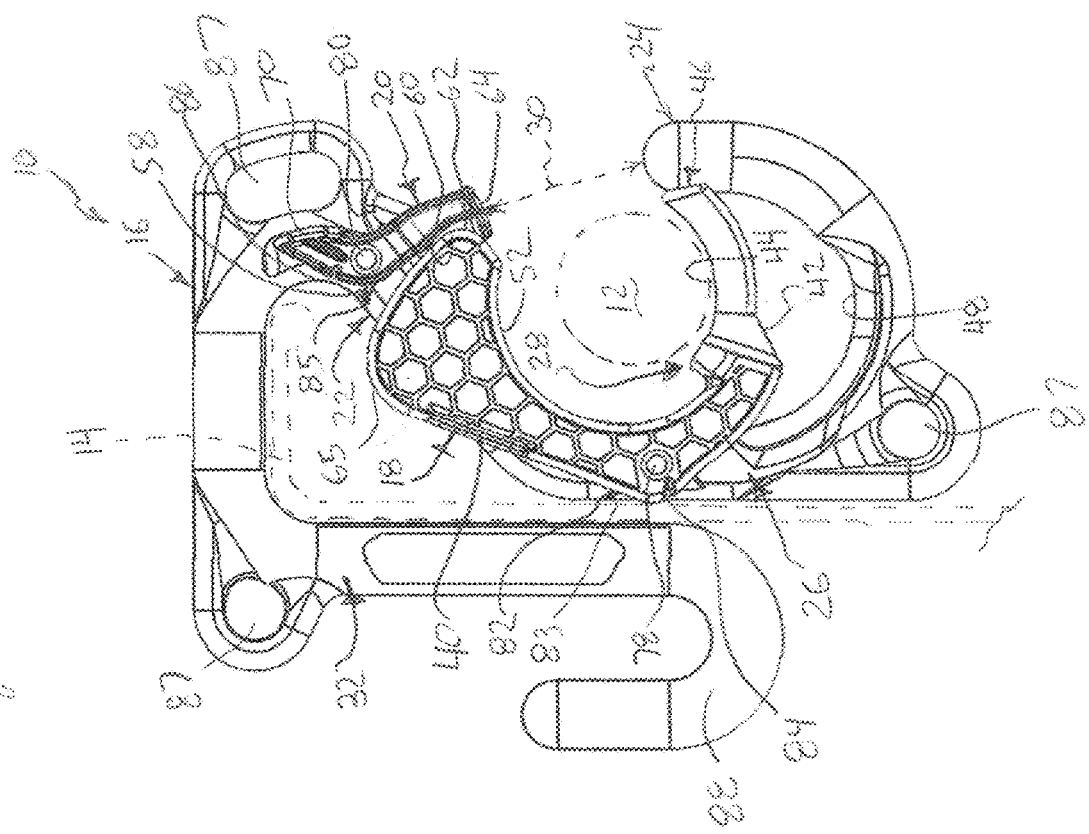

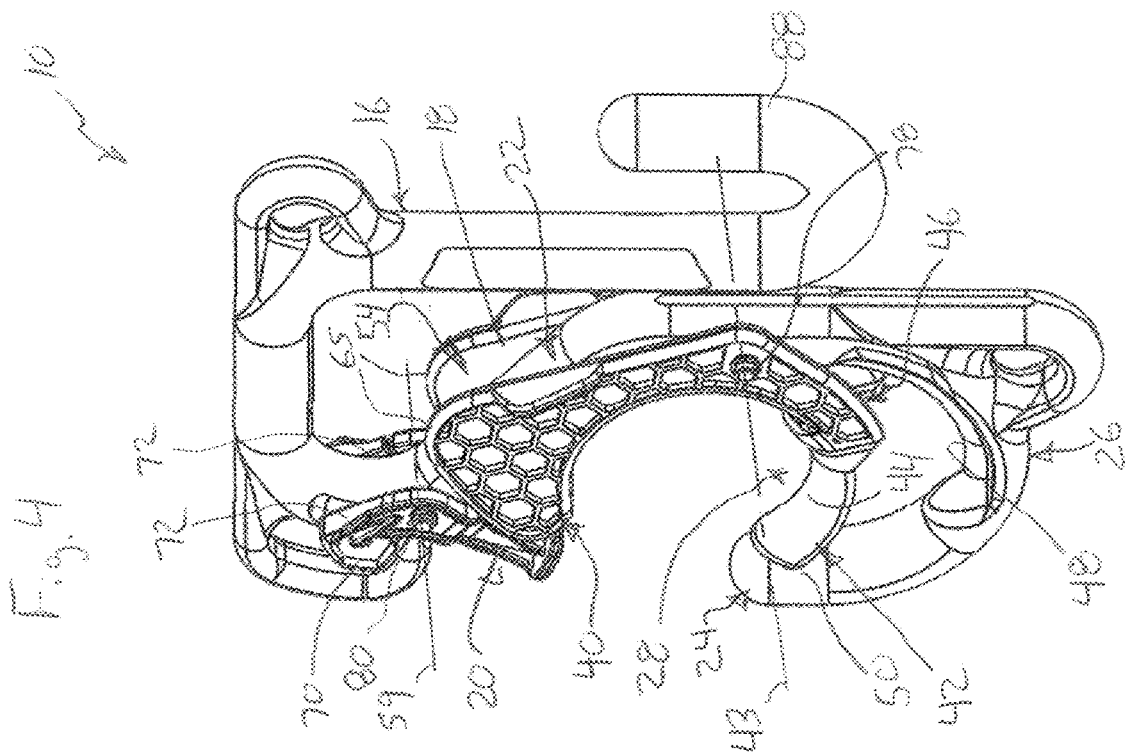

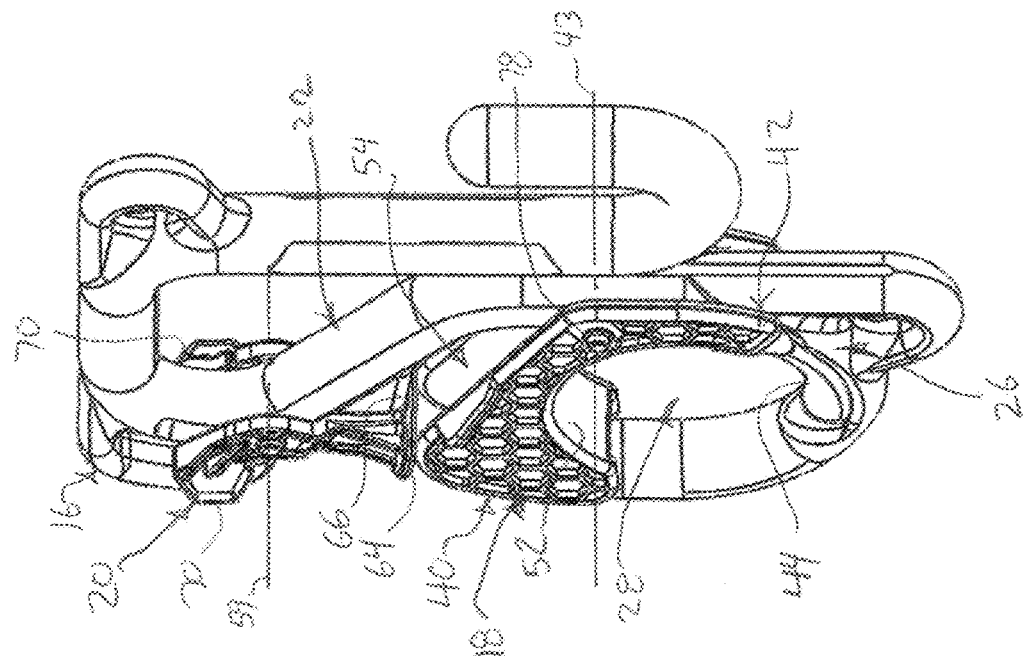
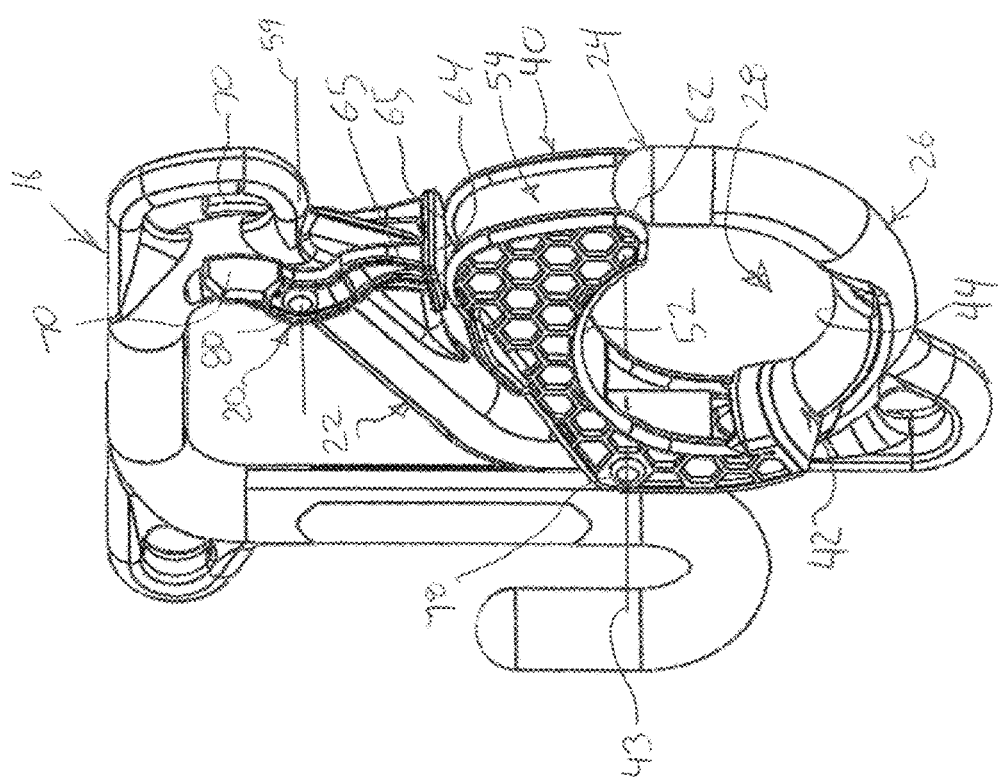

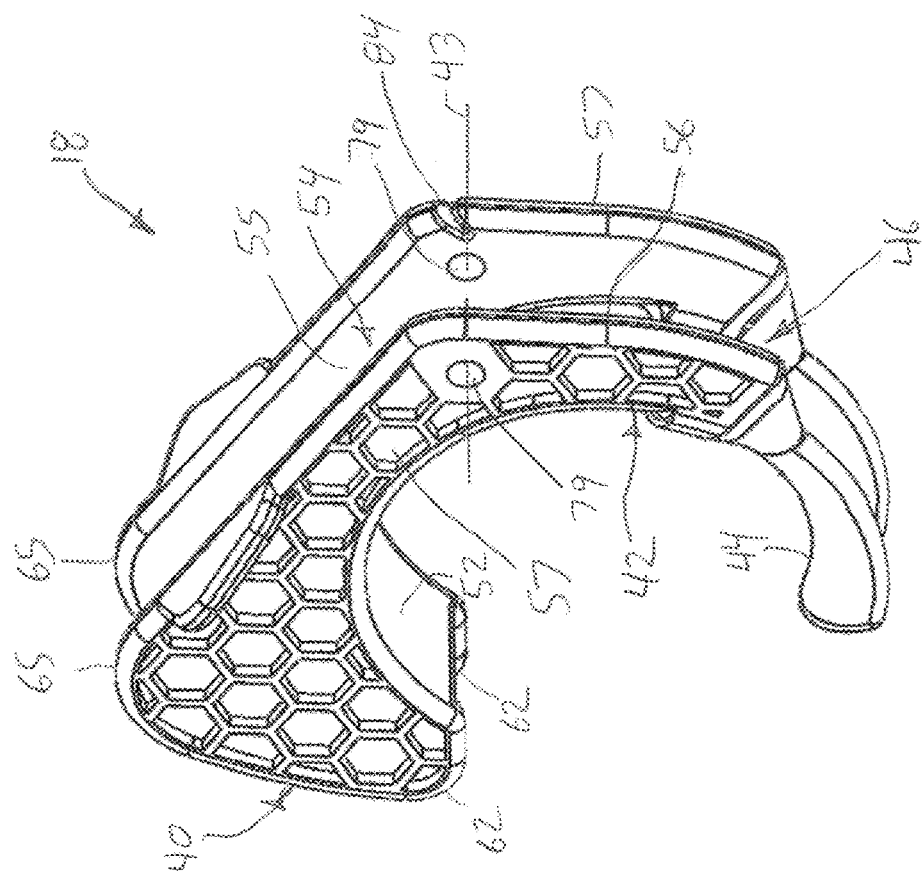
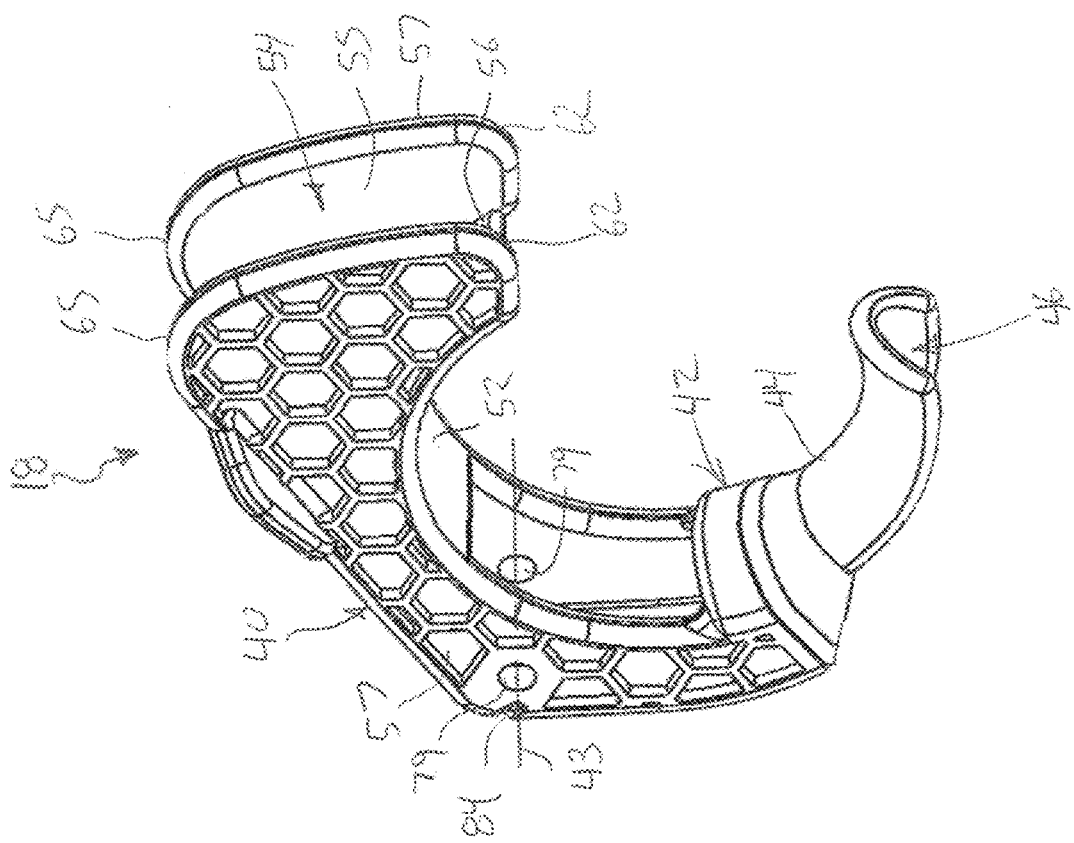

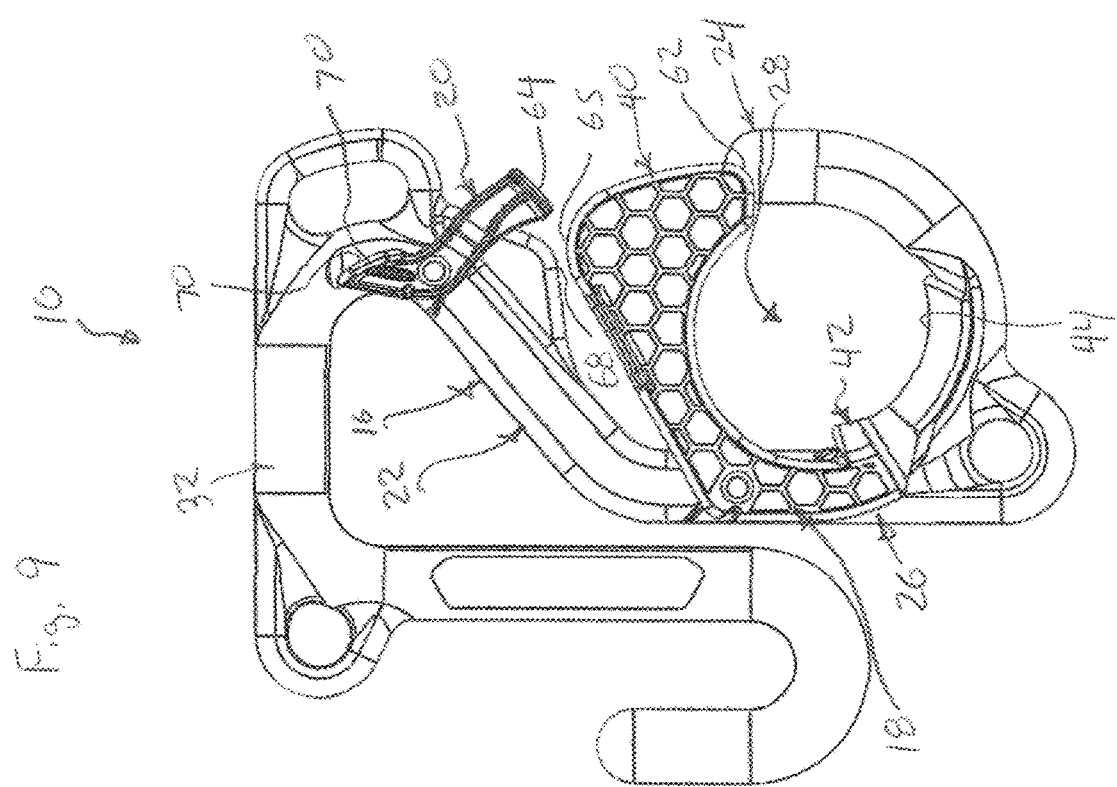
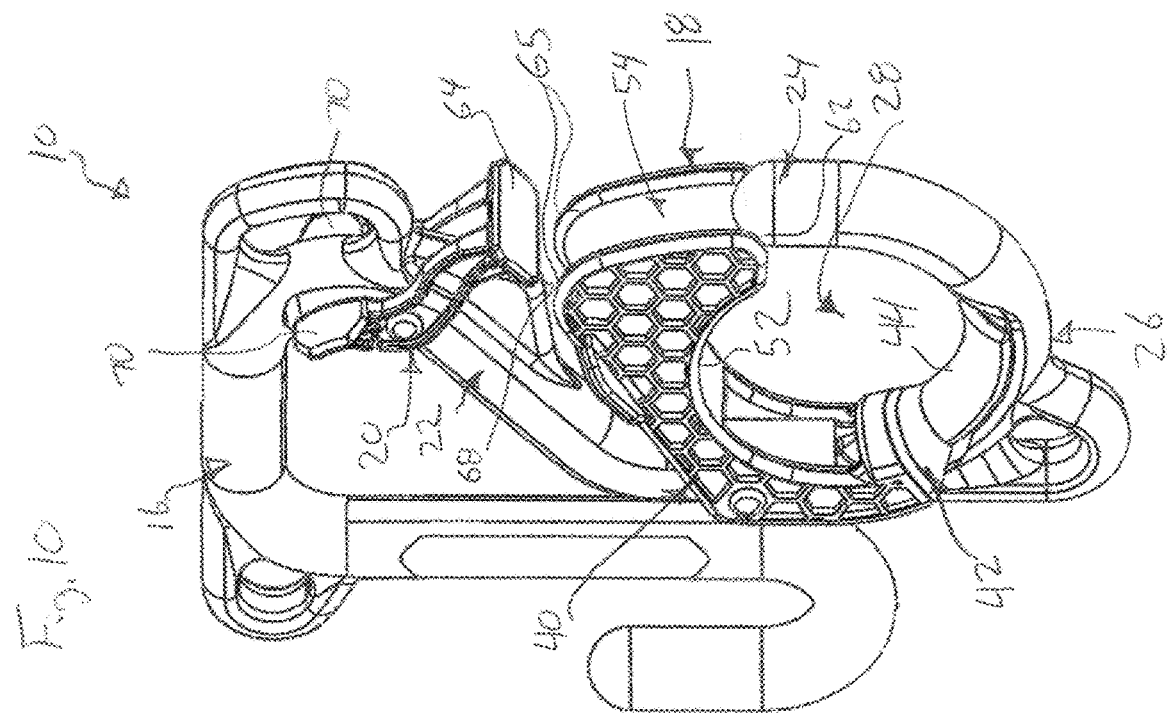

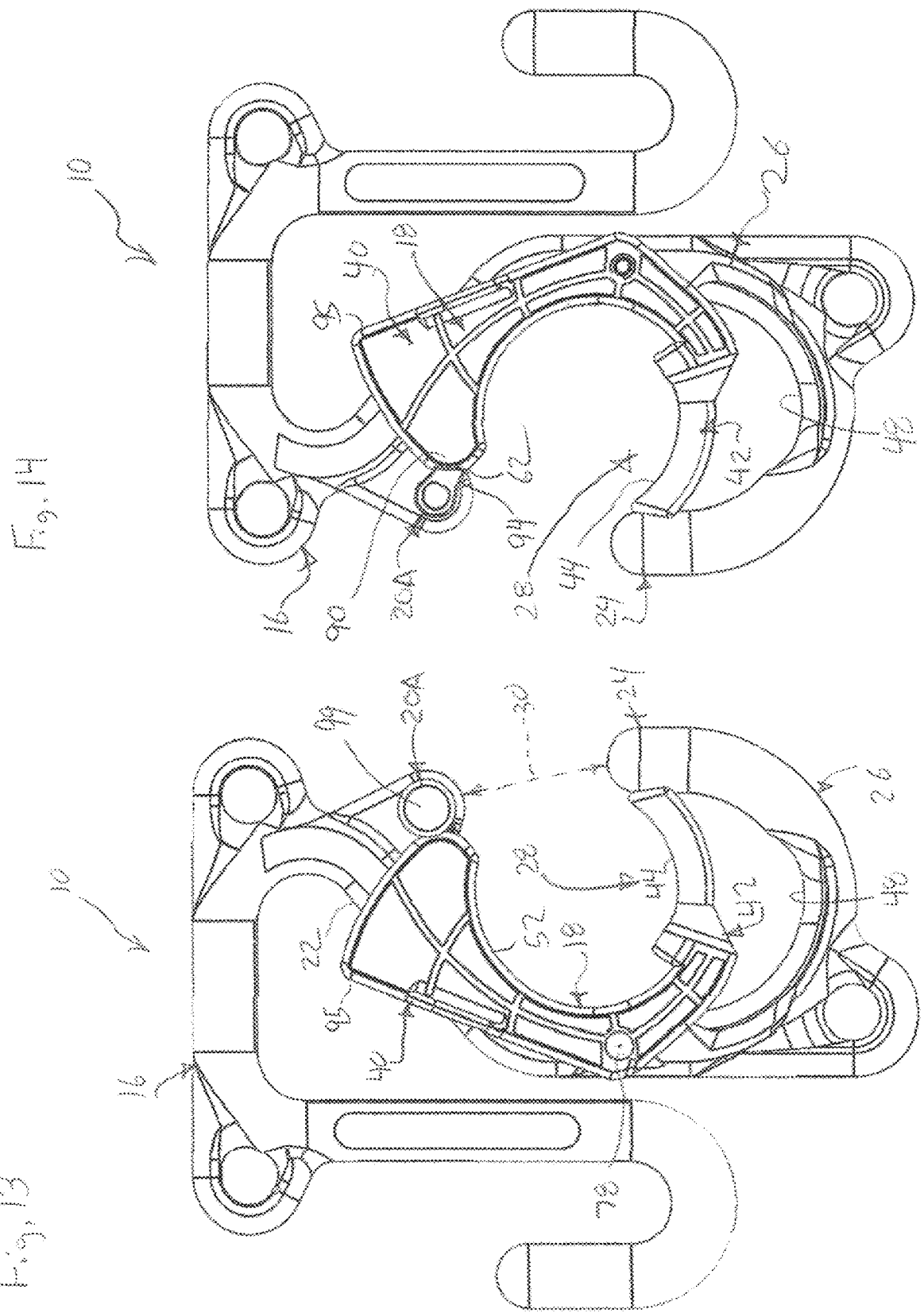

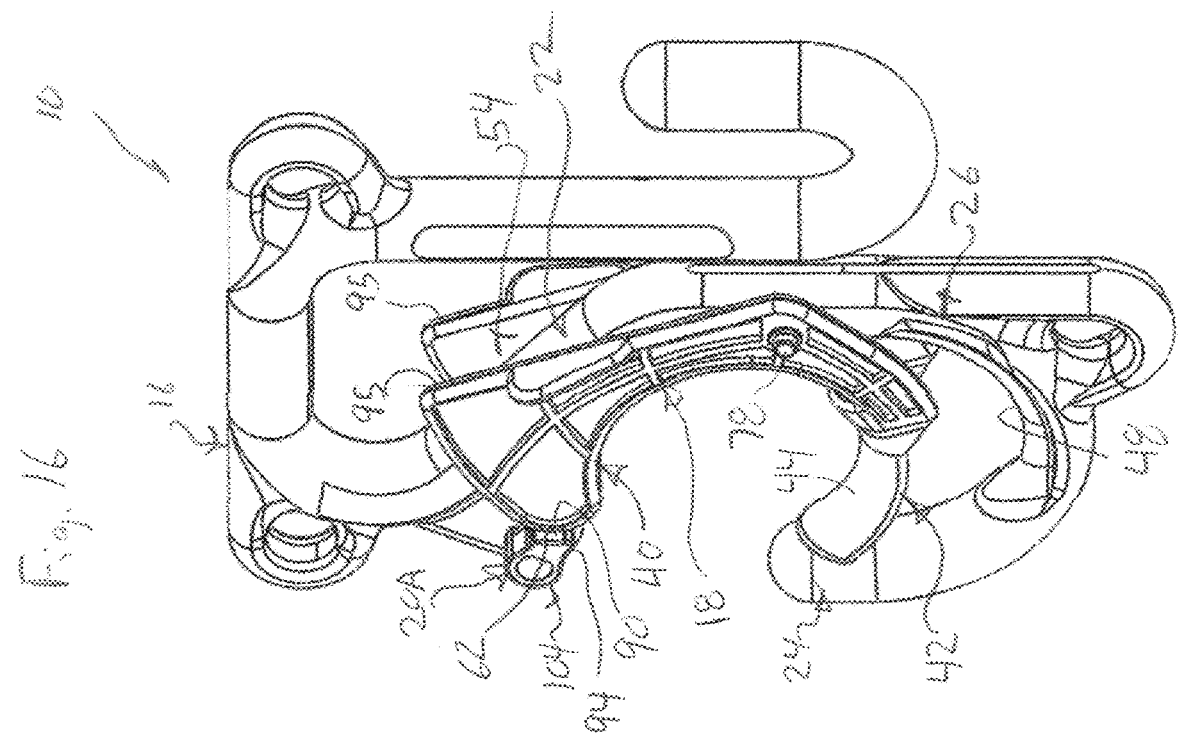
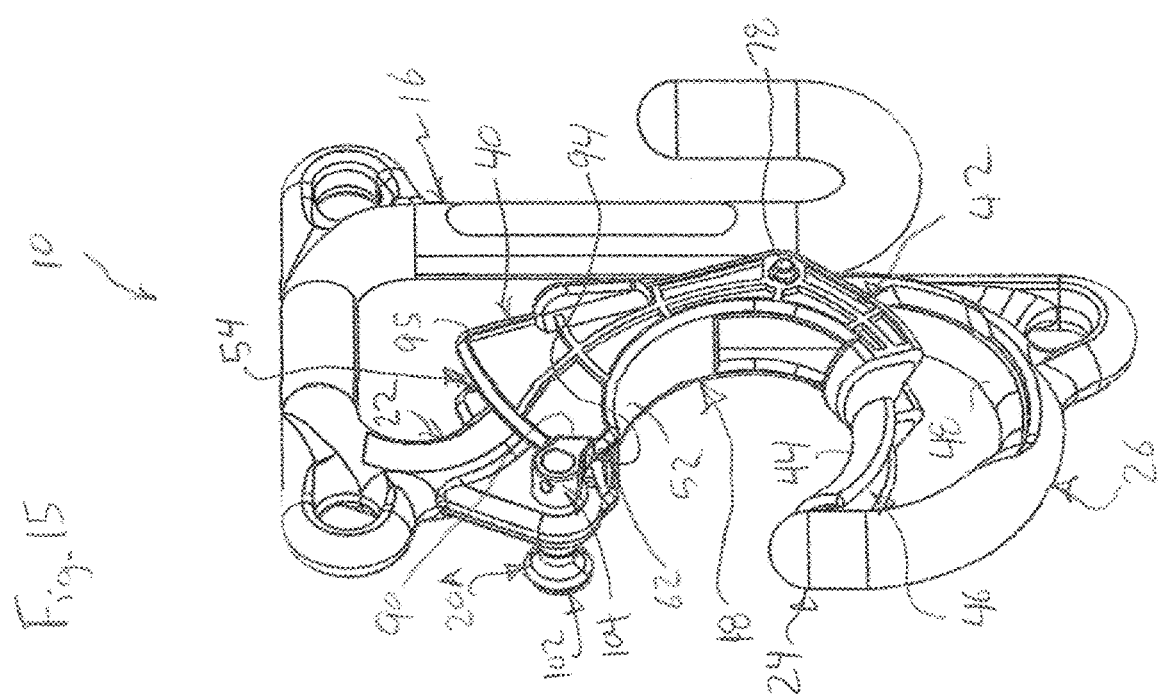

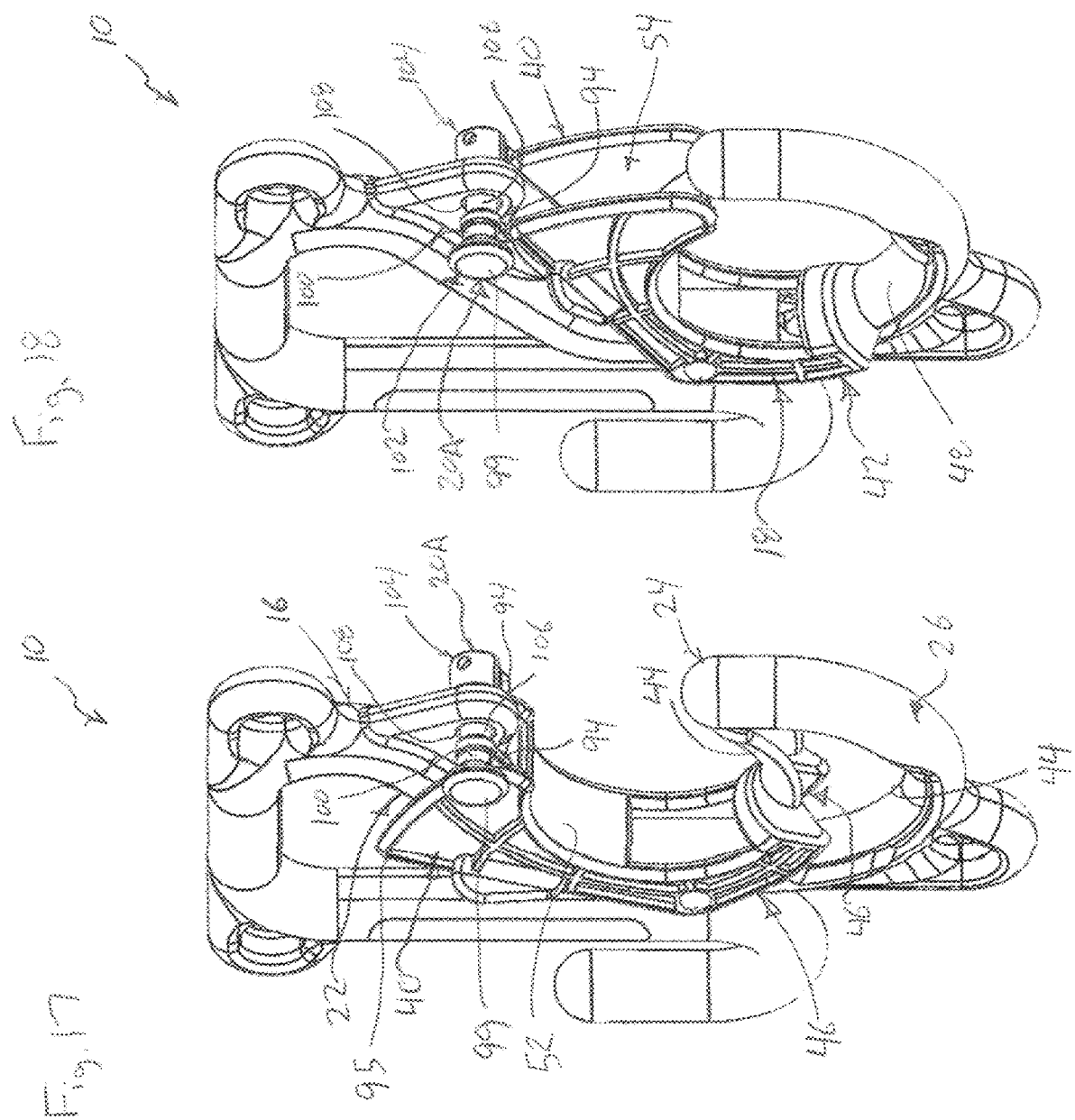

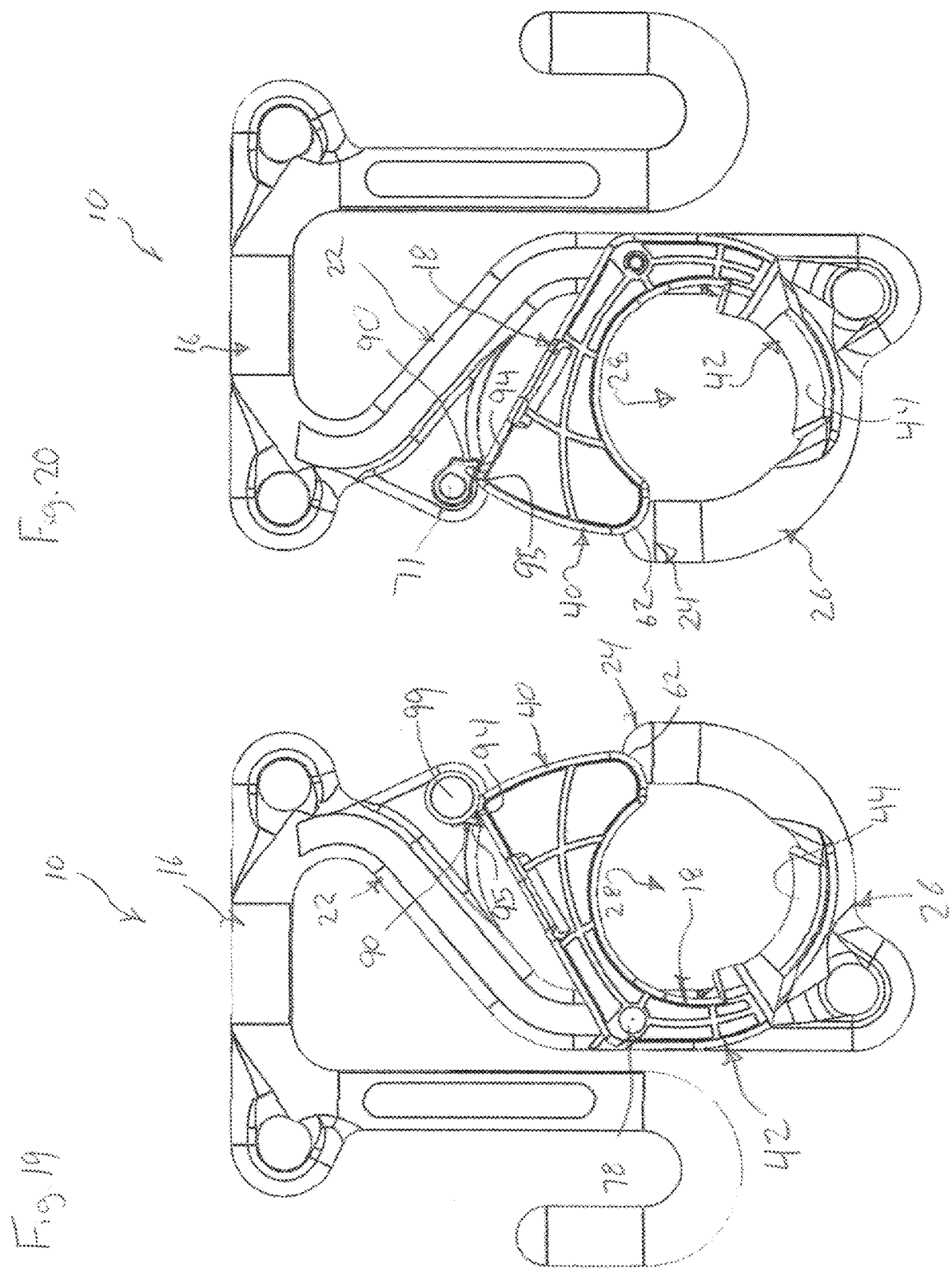

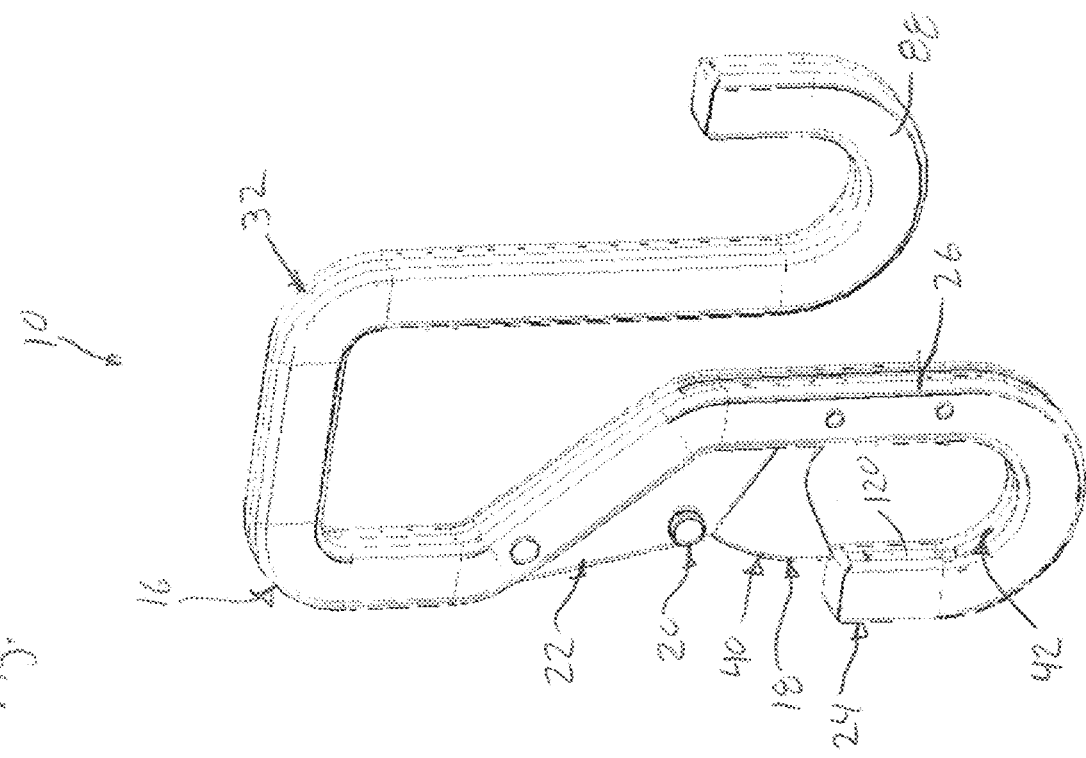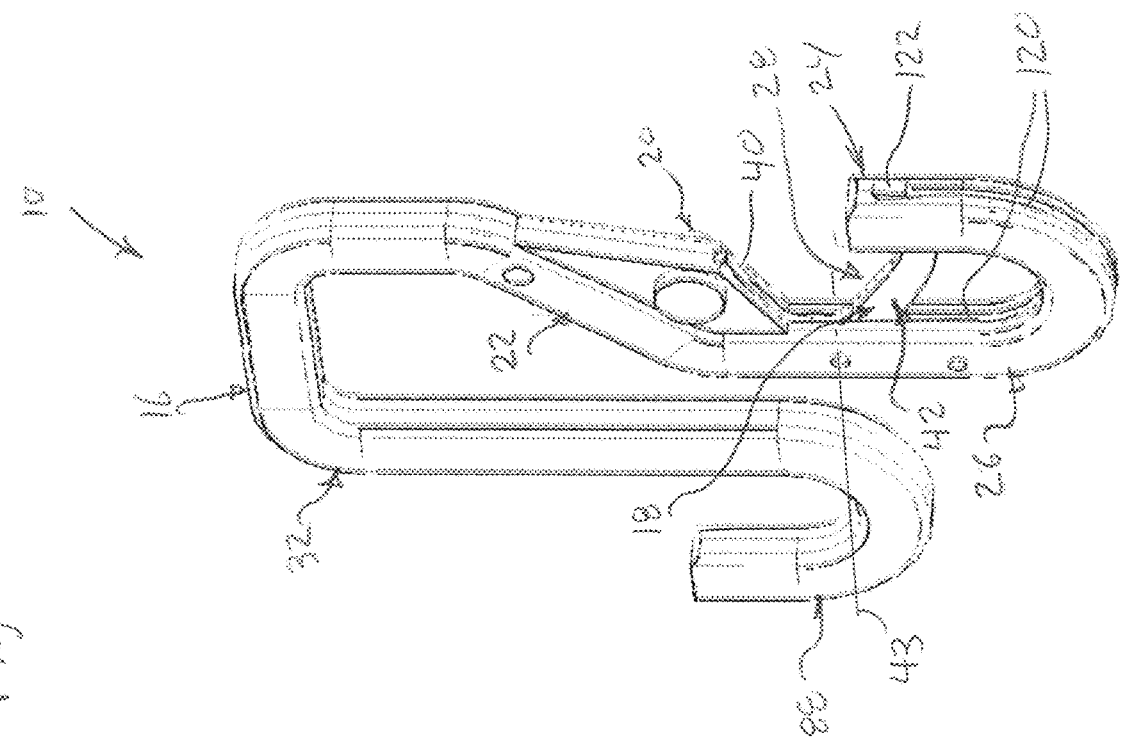

GATED SAFETY HOOK

CROSS-REFERENCE TO RELATED APPLICATIONS

None

BACKGROUND OF THE DISCLOSURE

The present disclosure relates hooks used to mount one or more objects, such as accessories in the form of tools, bags, ropes, cords, cables, etc., to a structure, such as a ladder, a wall stud, the rail/sidewall of an elevated work platform, etc., so that a worker can store or access the object as needed. In particular, this disclosure is relates to such hooks that also include a gate that is used to retain and/or secure an object that is mounted on the hook. Such hooks are well known and there are many different commercially available embodiments, however there is always a continuing need for improvements. For example, there is a continuing need for such hooks that are simple to operate, that can be produced for a reasonable cost or more economical cost, and/or that provide increased safety by reducing the possibility of user error and/or providing redundant safety features.

BRIEF SUMMARY OF THE DISCLOSURE

In accordance with one feature of this disclosure, In accordance with one feature of this disclosure, a safety hook is provided for mounting an object to a structure. The safety hook includes a frame, a gate, and a user actuated catch. The frame has an upper portion, a tip, a hook-shaped portion extending from the upper portion to the tip to define a mount opening that receives an object mounted on the hook, and a gap extending between the tip and the upper portion to allow an object to be inserted into the mount opening. The gate has an upper arm and a lower arm that are fixed relative to each other. The gate is mounted to the hook to pivot between an open position and a closed position. In the open position, the upper arm is spaced from the gap to allow an object to be inserted into the mount opening and the lower arm extends across the mount opening to be engaged by an object that is inserted into the mount opening. In the closed position, the upper arm extends across the gap to prevent an object from exiting the mount opening through the gap and the lower arm is positioned adjacent the hook-shaped portion to abut an object mounted on the hook-shaped portion in response to movement of the gate toward the open position. The user actuated catch is mounted to the frame to move between a retain position, a lock position, and a release position. In the retain position, the catch is engaged with the gate to retain the gate in the open position. In the lock position, the catch is engaged with the gate to retain the gate in the closed position. In the release position, the catch is disengaged from the gate to allow the gate to move between the closed position and the open position.

In one feature, the catch is configured to move from the retain position to the release position in response to the gate moving from the open position toward the closed position.

As one feature, the catch is mounted to the frame to pivot between the retain, lock, and release positions.

In another feature, the catch is mounted to the frame to translate between the release position and at least one of the retain position and the position.

According to one feature, the catch is biased toward the retain and lock positions.

As another feature, the lower arm abuts the hook-shaped portion to transfer a load from an object mounted on the hook to the hook-shaped portion with the gate in the closed position. In a further feature, the lower arm includes: a load surface that engages an object received in the mount opening; and a channel that receives part of the hook-shaped portion with the gate in the closed position, with at least a portion of the channel underlying the load surface.

In yet a further feature, the lower arm includes a channel that receives part of the tip with the gate in the open position.

In one feature, the upper arm includes a channel that receives part of the upper portion with the gate in the open position.

As one feature, wherein the upper arm includes a channel that receives part of the tip with the gate in the closed position.

According to one feature, the gate is biased toward the open position.

In another feature, the gate is biased toward the closed position.

In one feature, the safety hook further includes a mount to support the safety hook on a structure. In a further feature, the rigid frame includes the mount and includes an L-shaped portion that extends from the upper portion to define the mount.

As one feature, the hook-shaped portion includes a groove that is opens toward the mount opening and the lower arm is received in the groove with the gate in the closed position.

In one feature, the upper portion includes a groove that is opens toward the gap and the upper arm is received in the groove with the gate in the open position.

In accordance with one feature or this disclosure, a safety hook is provided for mounting an object to a structure. The safety hook includes a frame, a gate, and a user actuated catch. The rigid frame has an upper portion, a tip, a hook-shaped portion extending from the upper portion to the tip to define a mount opening that receives an object that is to be mounted on the hook, and a gap extending between the tip and the upper portion to allow an object to be inserted into the mount opening. The gate has an upper arm and a lower arm that are fixed relative to each other. The gate is mounted to the hook to pivot between an open position and a closed position. In the open position, the upper arm is spaced from the gap to allow an object to be inserted into the mount opening and the lower arm extends across the mount opening to be engaged by an object that is inserted into the mount opening. In the closed position, the upper arm extends across the gap to prevent an object from exiting the mount opening through the gap. The user actuated catch is mounted to frame to move between a retain position, a lock position, and a release position. In the retain position, the catch is engaged with the gate to retain the gate in the open position. In the lock position, the catch is engaged with the gate to retain the gate in the closed position. In the release position, the catch is disengaged from the gate to allow the gate to move between the closed position and the open position. The catch is configured to move from the retain position to the release position in response to the gate moving from the open position toward the closed position.

As one feature, the catch is mounted to the upper portion.

In one feature, the catch is mounted to the frame to pivot between the retain, lock, and release positions.

In another feature, the catch is mounted to the frame to translate between the release position and at least one of the retain position and the lock position.

As one feature, the catch is biased toward the retain and lock positions.

According to one feature, the safety hook further includes a spring engaged between the upper portion and the catch to bias the catch toward the retain and lock positions.

In one feature, the catch has a first surface and the gate has a second surface. The first and second surfaces are engaged against each other with the gate in the open position and the catch in the retain position. The first and second surfaces are shaped to slide past each other as the catch moves from the retain position toward the release position and the gate moves from the open position toward the closed position.

According to one feature, the lower arm includes: a load surface that engages an object received in the mount opening; and a channel that receives part of the hook-shaped portion with the gate in the closed position, with at least a portion of the channel underlying the load surface.

As one feature, the lower arm includes a channel that receives part of the tip with the gate in the open position.

In one feature, the upper arm includes a channel that receives part of the tip with the gate in the closed position.

According to one feature, the gate is biased toward the open position.

In another feature, the gate is biased toward the closed position.

As one feature, the safety hook of further includes a mount to support the safety hook on a structure. In a further feature, the rigid frame includes the mount and includes an L-shaped portion that extends from the upper portion.

According to one feature, the hook-shaped portion includes a groove that opens toward the mount opening and the lower arm is received in the groove with the gate in the closed position.

In one feature, the upper portion includes a groove that opens toward the gap and the upper arm is received in the groove with the gate in the open position.

It should be understood that the inventive concepts disclosed herein do not require each of the features discussed above, may include any combination of the features discussed, and may include features not specifically discussed above.

BRIEF SUMMARY OF THE SEVERAL VIEWS
OF THE DRAWINGS

FIG. 1 is a side elevation view of a gated safety hook according to this disclosure, showing a gate in an open position and a catch in a retain position;

FIG. 2 is view similar to FIG. 1, but showing the gate in a closed position and the catch in a lock position;

FIG. 3 is a perspective view from the front and to one side of the gated safety hook of FIGS. 1 and 2, again showing the gate in the open position and the catch in the retain position;

FIG. 4 is a perspective view from the back and to an opposite side of the gated safety hook of FIGS. 1-3, again showing the gate in the open position and the catch in the retain position;

FIG. 5 is a view similar to FIG. 3, but showing the gate in the closed position and the catch in the lock position;

FIG. 6 is a view similar to FIG. 4, but showing the gate in the closed position and the catch in the lock position;

FIG. 7 is a view from the front and to the side of the gate of FIGS. 1-6;

FIG. 8 is a view from the rear and to the opposite side of the gate for FIGS. 1-7;

FIG. 9 is a view similar to FIGS. 1 and 2, but showing the gate in the closed position and the catch in a release position;

FIG. 10 is a view similar to FIGS. 3 and 5, but showing the gate in the closed position and the catch in the release position;

FIG. 13 is a view similar to FIG. 1, but showing another embodiment of the gated safety latch according to this disclosure with a gate in an open position and a catch in a retain position;

FIG. 14 is an elevation of the opposite side of the gated safety latch of FIG. 13, again showing the gate in the open position and the catch in the retain position;

FIG. 15 is a perspective view from the front and to the opposite side of the gated safety hook of FIGS. 13 and 14, again showing the gate in the open position and the catch in the retain position;

FIG. 16 is a perspective view from the rear and to the opposite side of the gated safety hook of FIGS. 13-15, again showing the gate in the open position and the catch in the retain position;

FIG. 17 is a perspective view from the front and to the side of the gated safety hook of FIGS. 13-16, again showing the gate in the open position and the catch in the retain position;

FIG. 18 is a view similar to FIG. 17, but showing the gate in a closed position and the catch in a lock position;

FIG. 19 is a view similar to FIG. 13, but showing the gate in the closed position and the catch in the lock position;

FIG. 20 is a view similar to FIG. 14, but showing the gate in the closed position and the catch in the lock position;

Figure 12:
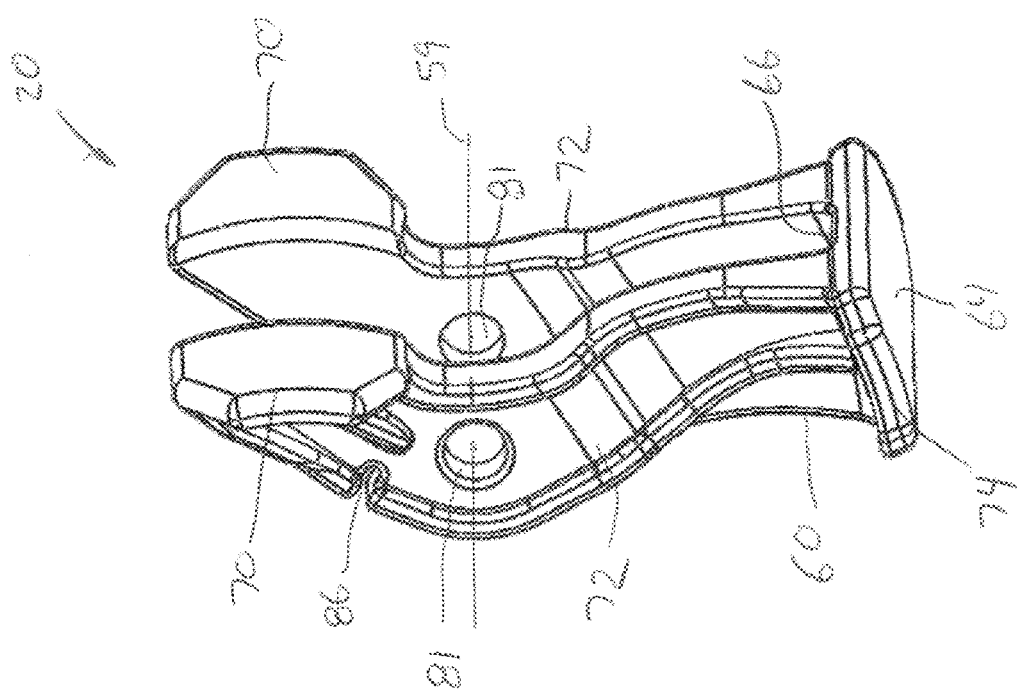
FIG. 12 is a view from the front and to the side of the catch shown in FIGS. 1-6 and 9-11.

FIG. 27 is a perspective view similar to FIGS. 3, 5, 10, and 17, but showing yet another embodiment of the gated safety hook according to this disclosure, with a gate in an open position and a catch in a retain position; and FIG. 28 is a perspective view similar to FIGS. 4, 6, 16, and 22, but showing the gated safety hook of FIG. 27 with the gate in a closed position and the catch in the retain position.

DETAILED DESCRIPTION OF PREFERRED
EMBODIMENTS

As best seen in FIGS. 1-6, a gated safety hook 10 is provided for mounting an object, shown diagrammatically at 12, to a load carrying structure or support, shown diagrammatically at 14. In the illustrated and preferred embodiments, the safety hook 10 includes a structural, load bearing frame 16, a gate 18, and a user actuated catch 20. In the preferred embodiments, the gate 18 closes automatically in response to an object 12 being mounted on the hook 10, the catch 20 automatically moves to lock the gate 18 closed in response to an object 12 being mounted on the hook 10, and the gate 18 cannot be opened with an object 12 mounted on the hook 10 without engaging against the object 12. It should be understood that the object 12 shown in FIGS. 1 and 2 is intended to represent any type of object or structure that can be loaded onto a safety hook, including for example, a carabiner, a shackle, a grommet fixed in the sidewall of a bag, an opening in load carrying structure, and/or a loop made of cable, rope, cord, fiber, or webbing. Furthermore, while the diagrammatic representation of the structure or support 14 in FIGS. 1 and 2 is intended to represent a sidewall/railing of an elevated work platform, it should also be understood that the safety hook 10 can be configured to mount on any suitable load bearing structure or support, including for example, a frame member, a ladder, another hook, and/or or a loop made of cable, rope, cord, fiber, or webbing.

The frame 18 has an upper portion 22, a tip 24, and a hook-shaped portion 26 extending from the upper portion 22 to the tip 24 to define a mount opening 28 that receives an object 12 mounted on the hook 10. The frame further defines a gap 30 extending between the tip 24 and the upper portion 22 to allow an object 12 to be inserted into the mount opening 28. In the illustrated embodiment, the frame 18 further includes an L-shaped portion 32 that extends from the upper portion 22 to define a mount 34 that serves to mount the hook 10 onto a structure 14. In the illustrated and preferred embodiment, the frame is a unitary, one-piece component that is formed from a single piece of suitable material, such as a suitable structural polymer, composite, or metal, and preferably is sufficiently rigid so as not to unacceptably deform when an object 12 having predetermined weight is mounted on in the mount opening 28 and the hook 10 is supported on a structure 14. In this regard, the predetermined weight will typically be the maximum intended load for the safety hook 10. Furthermore, in the illustrated and highly preferred embodiment, the L-shaped portion 32 of the frame 18 should be flexible enough to allow a structure 14, such as the sidewall 14 of an elevated work platform, to be inserted into the mount 34 without any permanent deformation of the frame 18.

The gate 18 has an upper arm 40 and a lower arm 42 that are fixed relative to each other. The gate 18 is mounted to the frame 14 to pivot about a horizontal axis 43 between an open position, shown in FIGS. 1, 3, and 4 and a closed position shown in FIGS. 2, 5, and 6. In the open position, the upper arm 40 is spaced from the gap 30 to allow an object 12 to be inserted through the gap 30 into the mount opening 28, and the lower arm 42 extends across the mount opening 28 to be engaged by an object 12 that is inserted into the mount opening 28. In the closed position, the upper arm 40 extends across the gap 30 to prevent an object 12 from exiting the mount opening 28 through the gap 30, and the lower arm is positioned adjacent the hook-shaped portion 26 to abut an object 12 mounted on the hook-shaped portion 26 in response to movement of the gate 18 toward the open position. In this regard, in the illustrated embodiment of FIGS. 1-6, the lower arm abuts the hook-shaped portion 26 with the gate 18 in the closed position to transfer a load to the hook-shaped portion 26 from an object 12 mounted on the hook 10 with the gate 18 in the closed position. Further in this regard, the lower arm 42 has a load surface 44 that engages an object 12 received in the mount opening 28.

In the illustrated embodiment, the lower arm 42 further includes a channel 46, best seen in FIGS. 7 and 8, that receives part of the hook-shaped portion 26 with the gate 18 in the closed position, with a portion of the channel 46 underlying the load surface 44. With the gate 18 in the open position, the channel 46 receives part of the tip 24. By receiving part of the frame 18 in both the open and closed positions of the gate 18, the channel 46 helps to stabilize the gate 18, allows the lower arm 42 to transfer sideloads to the frame 18, and reduces the possibility that the object 12 or a portion of the object 12 will work its way between the lower arm 42 and the frame 18. In the illustrated embodiment, the channel 46 has an arcuate, transverse cross-section that conforms to surfaces 48 and 50 on the hook-shaped portion 26 and the tip 24, respectively, that face the mount opening 28.

In the illustrated embodiment, the upper arm 40 includes a surface 52 that will abut an object 12 that attempts to move out of the mount opening 28 via the gap 30 with the gate 18 in the closed position. The illustrated upper arm 42 also includes a channel 54, best seen in FIGS. 7 and 8, that receives part of the tip 24 with the gate 18 in the closed position, and that receives part of the upper portion 22 with the gate 18 in the open position. The channel 54 is defined by a pair of spaced, planar side-surfaces 55 that extend upwardly from an arcuate base surface 56, with the side-surfaces being defined by a pair of sidewalls 57 that extend from the upper arm 40 to the lower arm 42. By receiving part of the frame 18 in both the open and closed positions of the gate 18, the channel 54 helps to stabilize the gate 18, allows the upper arm 40 to transfer sideloads to the frame 18, and reduces the possibility that the object 12 or a portion of the object 12 will work its way between the upper arm 42 and the frame 18. While any suitable method of manufacture and material can be used, the illustrated and preferred embodiment of the gate 18 in FIGS. 1-10 is a rigid, unitary, one-piece component molded from a suitable piece of material, such as a suitable polymer, metal, or composite.

The catch 20 of the preferred embodiment shown in FIGS. 1-6 is mounted to the upper portion 22 of the frame 18 to pivot about a horizontal axis 59 between: a retain position shown in FIGS. 1, 3, and 4; a lock position shown in FIGS. 2, 5 and 6; and a release position shown in FIGS. 9 and 10. In the illustrated and preferred embodiment, the catch 20 is biased toward the retain and lock positions by a torsion spring 58 that is engaged between the frame 16 and the catch 20 to bias the catch toward the retain and lock positions. In the retain position, the catch 20 is engaged with the gate 18 to retain the gate 18 in the open position. In this regard, in the illustrated and preferred embodiment, the catch 20 has a pair of concave surfaces 60 that engage convex surfaces 62 on the upper arm 40. A frictional engagement of the surfaces 60 and 62 generated by the force of the spring 58 is sufficient to retain the gate 18 in the open position, but will be overcome by the force placed on the lower arm 42 by an object 12 as it moves into the mount opening and engages the lower arm 42. This will result in the upper arm 40 forcing the catch 20 to pivot counterclockwise in FIG. 1 to the release position as the gate 18 moves from the open position to the closed position. It should be appreciated that this all occurs without requiring a user to do anything other than insert a object 12 through the gap 30 and into the mount opening 28. With the gate 18 in the closed position, the bias force of the spring 59 automatically moves the catch 20 clockwise in FIG. 2 to the lock position. In the lock position, the catch 20 is engaged with the gate 18 to retain the gate 18 in the closed position. In this regard, in the illustrated and preferred embodiment, the catch 20 has a convex surface 64 that engage a pair of convex surfaces 65 on the upper arm 40, and also has a concave surface 66, opposite the surface 64, that overlays and abuts a stop surface 68 on the upper portion 22 of the frame 16. Any attempted movement of the gate 18 from the closed position will be opposed by a force transmitted from the surface 68 to the surface 66 and then from the surface 64 to the surfaces 65 because the positions of the engaged surfaces 64 and 65 relative to the axis 59 pushes the surface 66 against the surface 68 on the frame 16. In the release position, the catch 20 is located to allow the gate 18 to move between the open and closed positions. In this regard, as previously discussed for the illustrated embodiment, the frictional engagement of the surfaces 60 and 62 is overcome by the force placed on the lower arm 42 by an object 12 being inserted into the mount opening 28, which allows the catch 20 to be automatically pivoted to the release position by the force of the gate 18 on the catch 20 as the gate 18 moves from the open position to the closed position. For movement of the catch 20 from the lock position to the release position with the gate 18 in the closed position, the catch 20 is provided with a pair of user engageable portions 70 that are located to pivot the catch 20 to the release position in response to a user pressing/pushing the portions 70 in a release direction, which is counterclockwise in FIGS. 1 and 2. This allows a user to actuate the catch 20 to the release position with the gate 18 in the closed position when a user wants to remove an object 12 that is mounted on the hook 10.

Figure 11:
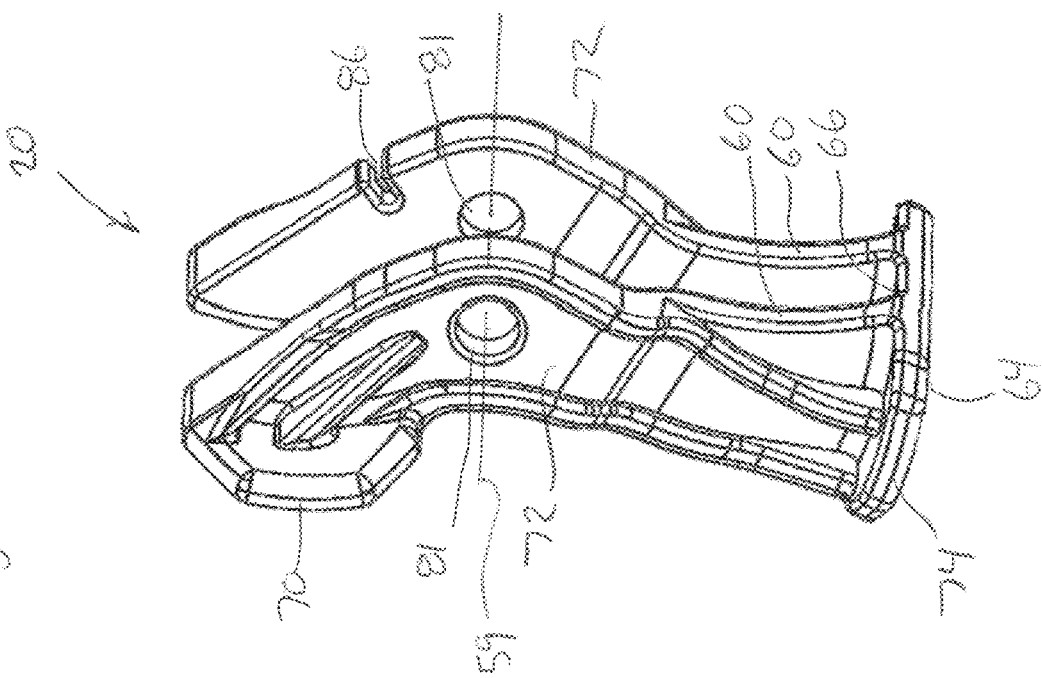
FIG. 11 is a view from the rear and to the opposite side of the catch shown in FIGS. 1-6, 9 and 10.
Figure 21:
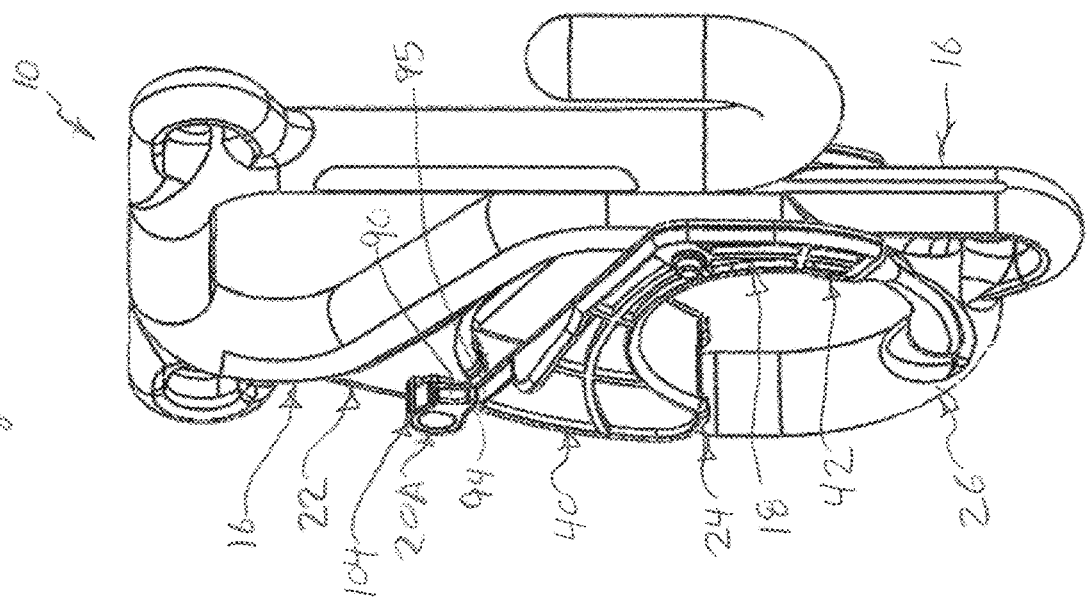
FIG. 21 is a view similar to FIG. 15, but showing the gate in the closed position and the catch in the lock position.
Figure 22:
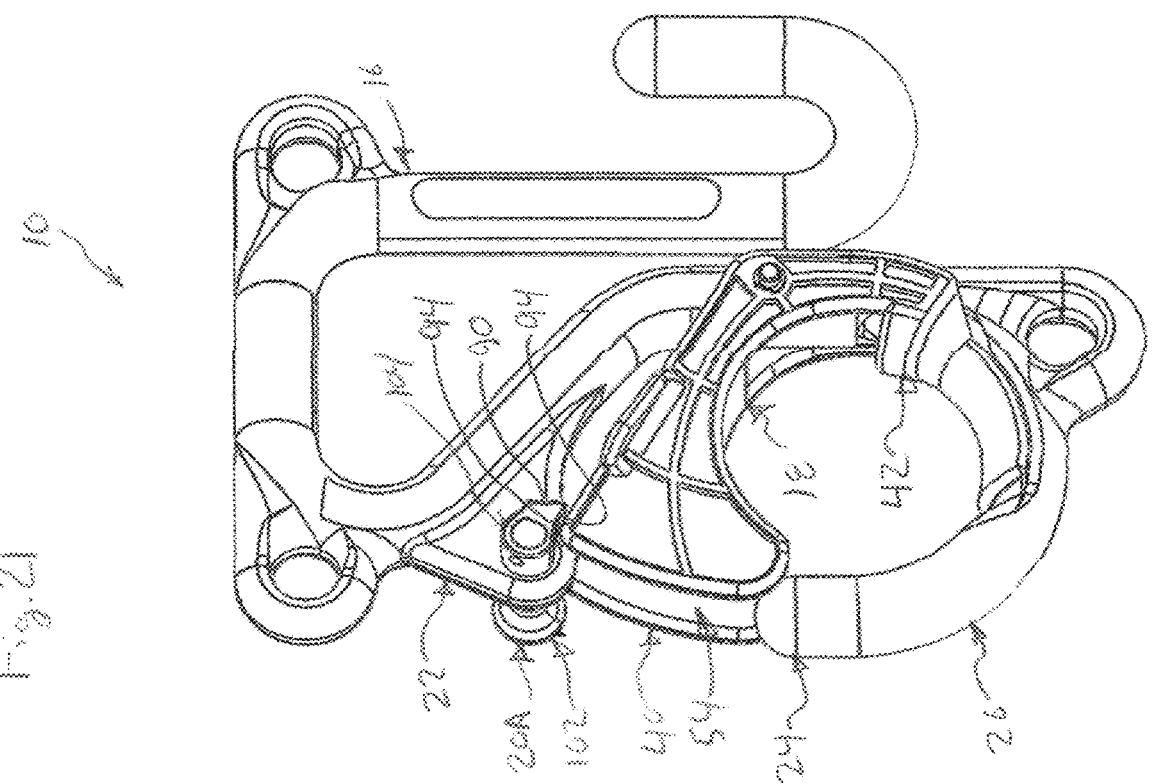
FIG. 22 is a view similar to FIG. 16, but showing the gate in the closed position and the catch in the lock position.

As best seen in FIGS. 11 and 12, in the illustrated and preferred embodiment, the catch 20 includes a pair of spaced sidewalls 72, with each side wall 72 defining one of the surfaces 60 and extending from one of the portions 70 to a base wall 74 that defines the surfaces 64 and 66. While any suitable method of manufacture and material can be used, the illustrated and preferred embodiment of the catch 20 in FIGS. 1-12 is a rigid, unitary, one-piece component molded from a suitable piece of material, such as a suitable polymer, metal, or composite.

While any suitable pivot mount, many of which are known, can be used, in the embodiment of FIGS. 1-12, the gate 18 is pivot mounted to the frame 16 by a rivet pin 78 that extends though a conforming journal bore in the frame 16 to engage receiving openings 79 formed in each of the sidewalls 57. Similarly, the catch 20 is pivot mounted to the frame 16 by a rivet pin 80 that extends through a conforming journal bore in the frame 16 to engage receiving openings 81 formed in each of the sidewalls 72.

In some embodiments, it may be desirable for the gate 18 to be biased toward the open position. In other embodiments, it may be desirable for the gate to be biased toward the closed position. In either case, the illustrated embodiment includes a torsion spring 82 engaged between the frame 16 and the gate 18 to bias the gate 18 to the desired position. One leg of the spring 82 can be engaged in a slot 83 formed in the frame 16 and the other leg of the spring 82 can include a foot that is engaged in a slot 84 formed in the gate 18. Similarly, one leg of the catch spring 58 can be engaged in a slot 85 formed in the frame 16 and the other leg of the spring 58 can be engaged in a slot 86 formed in the catch 20. While the torsion springs 58 and 82 are preferred, it should be appreciated that any suitable type of springs, many of which are known, can be used to bias the gate 18 and the catch 20 toward the desired positions, including for example, helical compression springs, helical tension springs, and clock springs.

In the illustrated embodiment, the frame 16 also includes three lanyard openings 87 for attaching lanyards to the frame 16, and an ungated hook 88 extending from the L-shaped portion 32 for attaching other objects to the frame 16. As previously discussed, in the preferred and illustrated embodiment, the frame 16, including the openings 87\ and the hook 88, is a unitary, one-piece component formed from a single piece of material.

FIGS. 13-26 show another embodiment of the gated safety hook 10 according to this disclosure. This embodiment is identical to the embodiment of FIGS. 1-12 except for the catch 20 which is a slide catch 20A, rather than the pivoted catch 20 of FIGS. 1-12, and for small changes in the upper portion 22 of the frame 16 and a portion of the gate 18 to better accommodate the slide catch 20, as will be described more fully below.

Figure 24:
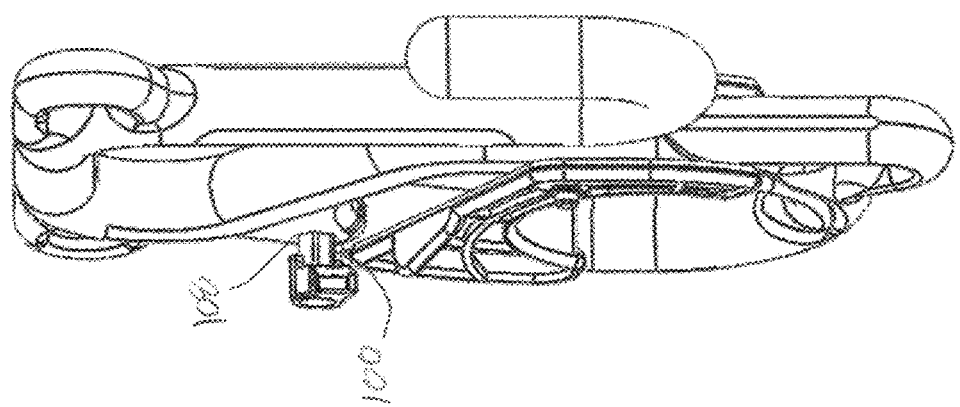
FIG. 24 is perspective view from the rear and slightly to the opposite side of the gated safety hook of FIGS. 13-23, but showing the gate in the closed position and the catch in the release position.
Figure 23:
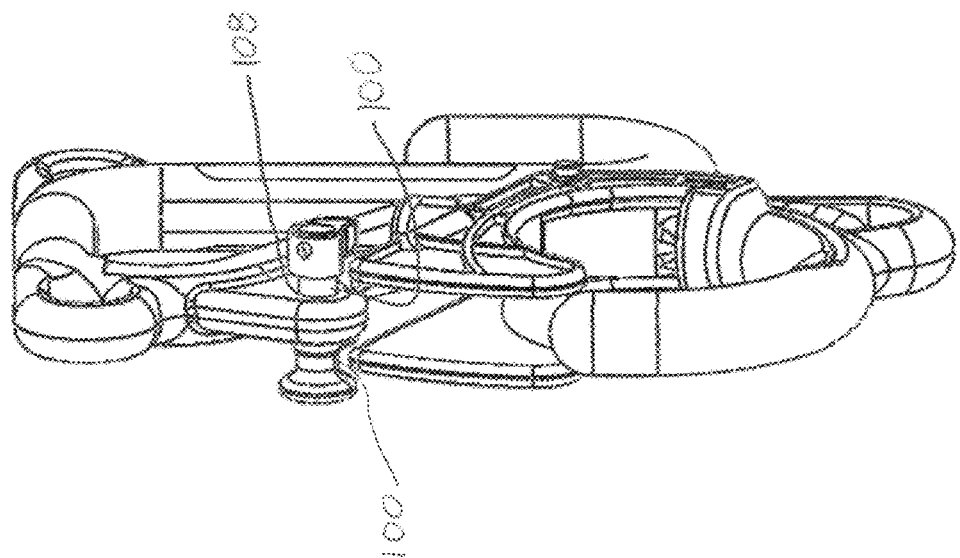
FIG. 23 is a perspective view from the front and slightly to the opposite side of the gated safety hook of FIGS. 13-21, but showing the gate in the closed position and the catch in a release position.

The slide catch 20A is mounted to the frame to pivot between a retain position shown in FIGS. 1-17, and a lock position shown in FIGS. 18-12, and to translate to a release position shown in FIGS. 23 and 24 from both the lock position and the retain position. In the retain position, the catch 20A is engaged with the gate 18 to retain the gate 18 in the open position. In this regard, in the illustrated and preferred embodiment, the catch 20A has a pair of concave surfaces 90 that engage the convex surfaces 62 on the upper arm 40. Preferably, a suitable spring, such as a torsion spring, biases the catch 20A to pivot toward the release and lock positions, with the bias force being clockwise in FIG. 13 and counterclockwise in FIG. 14. As with the embodiment of FIGS. 1-12, the frictional engagement of the surfaces 90 and 62 is sufficient to retain the gate 18 in the open position, but will be overcome by the force placed on the lower arm 42 by an object 12 as it moves into the mount opening and engages the lower arm 42. This will result in upper arm 40 forcing the catch 20A to pivot counterclockwise in FIG. 13 and clockwise in FIG. 14, thereby disengaging the surfaces 90 and 62 as the gate 18 moves from the open position to the closed position. In the lock position, the catch 20A is engaged with the gate 18 to retain the gate 18 in the closed position. In this regard, in the illustrated and preferred embodiment, the catch 20A has a pair of surfaces 94 that engage a pair of surfaces 95 on the upper arm 40. It should be noted that the surfaces 95 on the upper arm 40 differ from the surfaces 65 on the upper arm 40 of the embodiment shown in FIGS. 1-12. The catch 20A has a stop surface 96, best seen in FIG. 25, that engages a stop surface 98 in the upper portion 22 of the frame 16 to react forces transferred from gate 18 via the engagement of the surfaces 94 and 95 resulting from an attempt to move the gate 18 from the closed position toward the open position. It should be noted that the surface 98 differs from the surface 68 of the frame 16 for the embodiment of FIGS. 1-12. Any attempted movement of the gate 18 from the closed position will be opposed by a force transmitted from the surface 98 to the surface 66 and then from the surfaces 94 to the surfaces 95 because the positions of the engaged surfaces 94 and 95 relative to the axis 59 attempts to rotate the catch 20A clockwise in FIG. 14 which pushes the surface 96 against the surface 98 on the frame 16. In the release position, the catch 20A is located to allow the gate 18 to move between the open and closed positions. Preferably, the catch 20A is biased to translate away from the release position by a suitable spring, which could be a helical torsion spring (not shown) that would also provide the previously discussed bias force to pivot the catch 20A toward the release and lock positions. The catch 20A is provided with a user engageable button surface 99 that allows a user to slide the catch 20A to the release position in response to a user pushing the button 70 in a release direction, which is into the page in FIGS. 13 and 19, out of the page in FIGS. 14 and 20, and from left to right in FIGS. 15, 17, and 18. This translation moves the surfaces 90 out of alignment with the surfaces 95 on the upper arm 40 and moves a pair of relief surfaces 100 into alignment with the surfaces 95, which provides clearance between the catch 20A and the upper arm 40. This allows a user to actuate the catch 20 to the release position with the gate 18 in the closed position when a user wants to remove an object 12 that is mounted on the hook 10 by moving the gate from the closed position to the open position.

Figure 25:
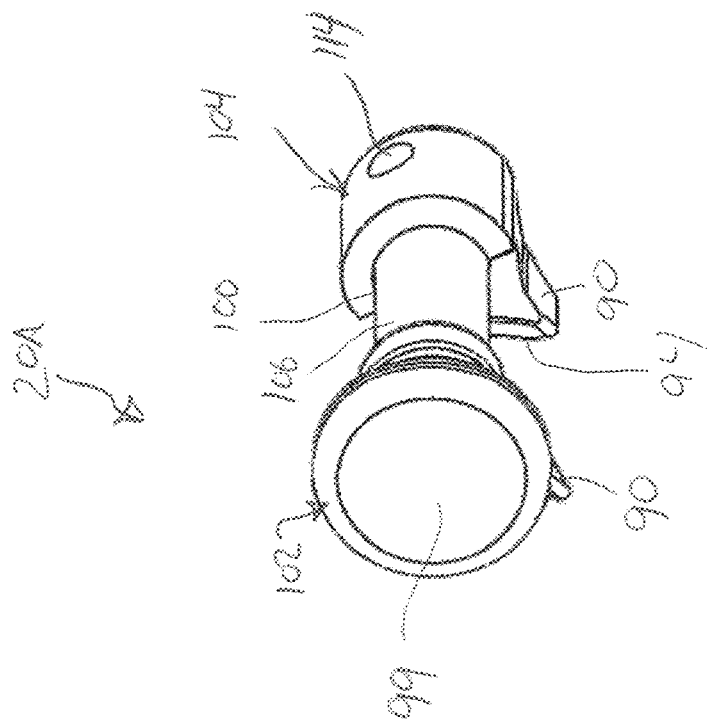
FIG. 25 is a perspective view from the rear and to the opposite side of the catch shown in FIGS. 13-24.
Figure 26:
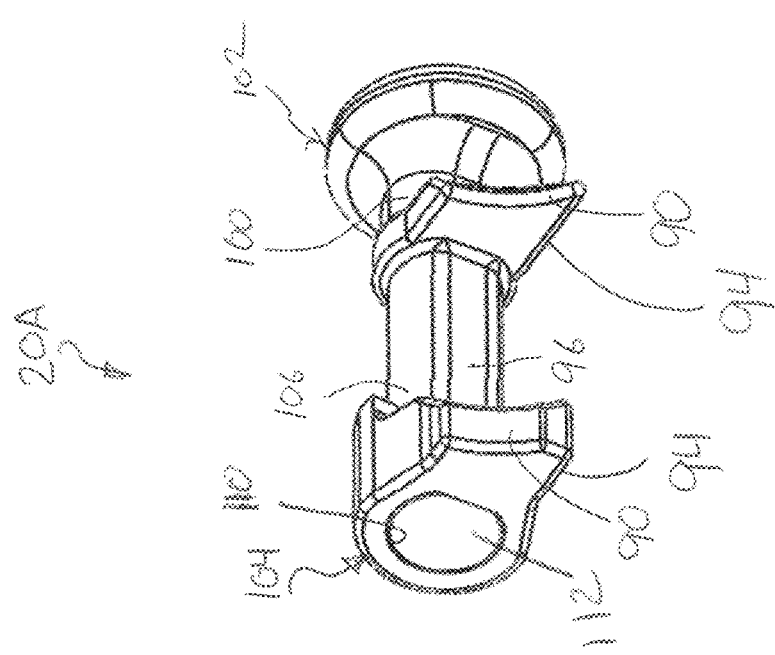
FIG. 26 is a perspective view from the front and to the side of the catch shown in FIGS. 13-25.

As best seen in FIGS. 25 and 26, in the illustrated and preferred embodiment, the catch is a two-piece construction and includes a first component 102 and a second component 104. The component 102 includes one of the surfaces 90, one of the surfaces 94, both of the reliefs 100, and a mount portion 106 that defines one of the reliefs 100 and the stop surface 96. In this regard, the mount portion has a D-shaped transverse cross-section, with the surface 96 defining the flat portion of the D-shape. The mount portion 106 is mounted in an opening 108 in the frame 16 for translation and limited pivoting motion relative to the frame 16. In this regard, the stop surface 98 is formed in the opening 108 to engage the surface 96 to limit the pivoting motion of the catch 20A relative to the frame 16. The component 104 includes one of the surfaces 90 and one of the surfaces 94. The component 104 includes a D-shaped opening 110 that conforms to the D-shaped cross-section of the mount portion 106 and receives and end 112 of the portion 106 to mount the component 104 on the component 102. As threaded fastener or lock pin 114 is used to secure the component 104 to the component 102. While any suitable method of manufacture and material can be used, each of the illustrated and preferred embodiments of the components 102 and 104 of the catch 20A in FIGS. 13-26 is a rigid, unitary, one-piece component molded or machined from a suitable piece of material, such as a suitable polymer, metal, or composite.

FIGS. 27 and 28 illustrate yet another embodiment of the gated safety hook 10 wherein the gate 18 has a planar form and the frame 16 includes a central channel 120 that receives the upper arm 40 with the gate 18 in the open position, as shown in FIG. 27, and that receives the lower arm 42 with the gate 18 in the closed position, as shown in FIG. 28. As seen in FIG. 27, the channel 120 extends to the tip 24 and receives an end portion 122 of the lower arm 42 with the gate in the open position. In the illustrated embodiment, the lower arm 42 is positioned lower than adjacent load surfaces 124 on the hook portion 26 of the frame 16 so that the hook portion 26 carries all of the load from an object 12 carried in the mount opening, but the gate 18 cannot move from the closed position without engaging the object 12. In this embodiment, the catch 20 is provided in a simplified form that translates between a lock position where the catch 20 engages the gate 18 to prevent movement of the gate 18 relative to the frame 16 and a release position where the catch 20 is disengaged from the gate 18 to allow movement of the gate 18 relative to the frame 16. The frame 16 of this embodiment does not include the lanyard openings 87, but does include the non-gated hook 88.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the gated safety hook 10 are shown in the figures, it should be understood that this disclosure anticipates variations in the specific details of each of the disclosed components and features of the gated safety hook 10 and that no limitation to a specific form, configuration, or detail is intended unless expressly and specifically recited in an appended claim.

For example, while specific and preferred forms have been shown for the gate 18 and for the mounting of the gate 18 to the frame 16, other configurations may be desired and employed. For example, the gate 18 of FIGS. 27 and 28 could be mounted to one side of the frame 16, rather than in the channel 120. As another example, the gates 18 of FIGS. 1-24 could be provided without one or both of the channels 46 and 54. As another example, the gates 18 of all of the illustrated embodiments could include a lower arm 42 that has been shortened so that it doesn't underly or engage an object 12 loading carried in the mount opening 28. As a further example, the catches 20 and 20A could be modified so that they do not automatically release the upper arm 40 when an object engages the lower arm 42 and so that a user must disengage the catch 20 or 20A to allow the gate 18 to move from the open to the closed position. As yet another example, the catch 20 of FIGS. 1-12 could be modified to include a single one of sidewalls 72. Similarly, the catch 20A of FIGS. 13-26 could be modified so that it has only one surface 90, one surface 94, and/or one relief 100, and in one such modification could be simplified to replace the component 104 with a simple snap-ring or other simple retainer. In another example, while it catch 20, 20A is mounted to the upper portion 22 of the frame 16 in the preferred embodiments, in some applications it may be desirable to mount the catch 20, 20A to other portions of a frame. Similarly, while the gate 18 is shown as being mounted to the hook portion 26 of the frame 16, in some applications it may be desirable to mount the gate 18 to other portions of a frame. Furthermore, it may be desirable to utilize and entirely different configuration for the catch 20 or 20A that still provides the functions of the illustrated and preferred embodiments. As another example, the frame does not need to include the non-gated hook 88, or the frame could include another safety hook with another catch 20 or 20A and corresponding gate 18.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A safety hook for mounting an object to a structure, the safety hook comprising:
   a frame having an upper portion, a tip, a hook-shaped portion extending from the upper portion to the tip to define a mount opening that receives an object mounted on the hook, and a gap extending between the tip and the upper portion to allow an object to be inserted into the mount opening;
   a gate having an upper arm and a lower arm that are fixed relative to each other, the gate mounted to the hook to pivot between an open position and a closed position, in the open position the upper arm is spaced from the gap to allow an object to be inserted into the mount opening and the lower arm extends across the mount opening to be engaged by an object that is inserted into the mount opening, in the closed position the upper arm extends across the gap to prevent an object from exiting the mount opening through the gap and the lower arm is positioned adjacent the hook-shaped portion to abut an object mounted on the hook-shaped portion in response to movement of the gate toward the open position; and
   a user actuated catch mounted to the frame to move between a retain position, a lock position, and a release position, in the retain position the catch is engaged with the gate to retain the gate in the open position, in the lock position the catch is engaged with the gate to retain the gate in the closed position, and in the release position the catch is disengaged from the gate to allow the gate to move between the closed position and the open position.

2. The safety hook of claim 1 wherein the catch is configured to move from the retain position to the release position in response to the gate moving from the open position toward the closed position.

3. The safety hook of claim 1 wherein the catch is mounted to the frame to pivot between the retain, lock, and release positions.

4. The safety hook of claim 1 wherein the catch is mounted to the frame to translate between the release position and at least one of the retain position and the lock position.

5. The safety hook of claim 1 wherein the catch is biased toward the retain and lock positions.

6. The safety hook of claim 1 wherein the lower arm abuts the hook-shaped portion to transfer a load from an object mounted on the hook to the hook-shaped portion with the gate in the closed position.

7. The safety hook of claim 6 wherein the lower arm includes:
   a load surface that engages an object received in the mount opening; and
   a channel that receives part of the hook-shaped portion with the gate in the closed position, with at least a portion of the channel underlying the load surface.

8. The safety hook of claim 6 wherein the lower arm includes a channel that receives part of the tip with the gate in the open position.

9. The safety hook of claim 1 wherein the upper arm includes a channel that receives part of the upper portion with the gate in the open position.

10. The safety hook of claim 1 wherein the upper arm includes a channel that receives part of the tip with the gate in the closed position.

11. The safety hook of claim 1 wherein the gate is biased toward the open position.

12. The safety hook of claim 1 wherein the gate is biased toward the closed position.

13. The safety hook of claim 1 further comprising a mount to support the safety hook on a structure.

14. The safety hook of claim 13 wherein the rigid frame comprises the mount and includes an L-shaped portion that extends from the upper portion to define the mount.

15. The safety hook of claim 1 wherein the hook-shaped portion includes a groove that opens toward the mount opening and the lower arm is received in the groove with the gate in the closed position.

16. The safety hook of claim 1 wherein the upper portion includes a groove that opens toward the gap and the upper arm is received in the groove with the gate in the open position.

17. A safety hook for mounting an object to a structure, the safety hook comprising:
   a frame having an upper portion, a tip, a hook-shaped portion extending from the upper portion to the tip to define a mount opening that receives an object that is to be mounted on the hook, and a gap extending between the tip and the upper portion to allow an object to be inserted into the mount opening;
   a gate having an upper arm and a lower arm that are fixed relative to each other, the gate mounted to the hook to pivot between an open position and a closed position, in the open position the upper arm is spaced from the gap to allow an object to be inserted into the mount opening and the lower arm extends across the mount opening to be engaged by an object that is inserted into the mount opening, in the closed position the upper arm extends across the gap to prevent an object from exiting the mount opening through the gap; and
   a user actuated catch mounted to the frame to move between a retain position, a lock position, and a release position, in the retain position the catch is engaged with the gate to retain the gate in the open position, in the lock position the catch is engaged with the gate to retain the gate in the closed position, and in the release position the catch is disengaged from the gate to allow the gate to move between the closed position and the open position;
   wherein the catch is configured to move from the retain position to the release position in response to the gate moving from the open position toward the closed position.

18. The safety hook of claim 17 wherein the catch is mounted to the upper portion.

19. The safety hook of claim 17 wherein the catch is mounted to the frame to pivot between the retain, lock, and release positions.

20. The safety hook of claim 17 wherein the catch is mounted to the frame to translate between the release position and at least one of the retain position and the lock position.

21. The safety hook of claim 17 wherein the catch is biased toward the retain and lock positions.

22. The safety hook of claim 17 further comprising a spring engaged between the upper portion and the catch to bias the catch toward the retain and lock positions.

23. The safety hook of claim 17 wherein the catch has a first surface and the gate has a second surface, the first and second surfaces engaged against each other with the gate in the open position and the catch in the retain position, the first and second surfaces shaped to slide past each other as the catch moves from the retain position toward the release position and the gate moves from the open position toward the closed position.

24. The safety hook of claim 17 wherein the lower arm includes:
   a load surface that engages an object received in the mount opening; and
   a channel that receives part of the hook-shaped portion with the gate in the closed position, with at least a portion of the channel underlying the load surface.

25. The safety hook of claim 17 wherein the lower arm includes a channel that receives part of the tip with the gate in the open position.

26. The safety hook of claim 17 wherein the upper arm includes a channel that receives part of the tip with the gate in the closed position.

27. The safety hook of claim 17 wherein the gate is biased toward the open position.

28. The safety hook of claim 17 wherein the gate is biased toward the closed position.

29. The safety hook of claim 17 further comprising a mount to support the safety hook on a structure.

30. The safety hook of claim 17 wherein the rigid frame comprises the mount and includes an L-shaped portion that extends from the upper portion.

31. The safety hook of claim 17 wherein the hook-shaped portion includes a groove that opens toward the mount opening and the lower arm is received in the groove with the gate in the closed position.

32. The safety hook of claim 17 wherein the upper portion includes a groove that open toward the gap and the upper arm is received in the groove with the gate in the open position.

* * * * *